(12) United States Patent
Scheuing et al.

(10) Patent No.: US 11,953,370 B2
(45) Date of Patent: Apr. 9, 2024

(54) METHOD AND DEVICE FOR DETECTING A LOOSENED BOLTED WHEEL JOINT ON A WHEEL

(71) Applicant: Robert Bosch GmbH, Stuttgart (DE)

(72) Inventors: Jan Scheuing, Vellberg (DE); Jens Berg, Bad Rappenau (DE)

(73) Assignee: ROBERT BOSCH GMBH, Stuttgart (DE)

( * ) Notice: Subject to any disclaimer, the term of this patent is extended or adjusted under 35 U.S.C. 154(b) by 399 days.

(21) Appl. No.: 17/418,454

(22) PCT Filed: Jan. 23, 2020

(86) PCT No.: PCT/EP2020/051602
§ 371 (c)(1),
(2) Date: Jun. 25, 2021

(87) PCT Pub. No.: WO2020/192982
PCT Pub. Date: Oct. 1, 2020

(65) Prior Publication Data
US 2021/0396572 A1 Dec. 23, 2021

(30) Foreign Application Priority Data
Mar. 25, 2019 (DE) .......................... 102019204026.8

(51) Int. Cl.
*G01H 1/00* (2006.01)
*B60B 3/16* (2006.01)
(Continued)

(52) U.S. Cl.
CPC ............... *G01H 1/003* (2013.01); *B60B 3/16* (2013.01); *F16B 41/002* (2013.01); *G01M 1/28* (2013.01); *B60B 2900/3316* (2013.01)

(58) Field of Classification Search
CPC ............ G01H 1/00; G01H 1/003; G01M 1/00; G01M 1/14–16; G01M 1/22; G01M 1/28;
(Continued)

(56) References Cited

U.S. PATENT DOCUMENTS

| 4,777,611 A | 10/1988 | Tashiro et al. |
| 6,904,371 B2 * | 6/2005 | Sonnichsen ......... G01M 13/028 |
| | | 702/56 |
| 2019/0041290 A1 | 2/2019 | Wagner et al. |

FOREIGN PATENT DOCUMENTS

| DE | 102013211697 A1 | 12/2014 |
| DE | 102016201331 A1 | 8/2017 |

(Continued)

OTHER PUBLICATIONS

International Search Report for PCT/EP2020/051602, dated Apr. 22, 2020.

*Primary Examiner* — Nguyen Q. Ha
(74) *Attorney, Agent, or Firm* — NORTON ROSE FULBRIGHT US LLP; Gerard A. Messina

(57) ABSTRACT

A method for detecting a loosened bolted wheel joint on a wheel of a vehicle. The angular velocity of a hub of the wheel is evaluated. A periodic wheel modulation of the angular velocity is ascertained. An oscillation of the wheel generated due to the loosened bolted wheel joint is detected, using a step-change in a phase angle of the modulation by an expected angular increment, which is a function of the number of bolts.

11 Claims, 3 Drawing Sheets

(51) Int. Cl.
*F16B 41/00* (2006.01)
*G01M 1/28* (2006.01)

(58) Field of Classification Search
CPC ..... G01M 17/013; F16B 41/00; F16B 41/002; B60B 3/16; B60B 2900/2216
See application file for complete search history.

(56) References Cited

FOREIGN PATENT DOCUMENTS

| | | |
|---|---|---|
| DE | 112016002232 T5 | 2/2018 |
| EP | 0902292 A2 | 3/1999 |
| JP | 2018506470 A | 3/2018 |

\* cited by examiner

METHOD AND DEVICE FOR DETECTING A LOOSENED BOLTED WHEEL JOINT ON A WHEEL

FIELD

The present invention relates to a method and a device for detecting a loosened bolted wheel joint on a wheel of a vehicle.

BACKGROUND INFORMATION

A rim of a wheel of a vehicle is joined to a hub of the wheel and/or to a brake disk or brake drum via a bolted wheel joint made up of wheel bolts or wheel nuts. The rim is pressed onto the hub by a clamping force of the bolted wheel joint. By tightening the bolted wheel joint, using a torque wrench, the clamping force may be set within a tolerance range.

The bolted wheel joint may loosen. If the bolted wheel joint is loosened to the point where the clamping force is too low to keep the rim and hub in flat contact, vibrations may occur. These vibrations may be reflected in a speed signal of a speed sensor at the hub.

For example, by evaluating a frequency spectrum of the speed signal, the vibrations may be detected, and the loosened bolted wheel joint may be deduced.

German Patent Application No. DE 10 2013 211 697 A1 describes a sensor unit for a vehicle.

SUMMARY

In accordance with example embodiments of the present invention, a method for detecting a loosened bolted wheel joint on a wheel of a vehicle, a corresponding device, and a corresponding computer program product and a machine-readable storage medium, are provided. Advantageous further refinements and improvements of the approach put forward here are derived from the disclosure herein.

Specific embodiments of the present invention may advantageously allow an evaluation of the speed signal to be improved and a loosened bolted wheel joint to be detected more reliably.

A method for detecting a loosened bolted wheel joint on a wheel of a vehicle is provided, which is characterized in that an angular velocity of a hub of the wheel is evaluated; a periodic wheel modulation of the angular velocity being ascertained, and an oscillation of the wheel generated due to the loosened bolted wheel joint being detected, using a change in a phase angle of the modulation.

Ideas for specific embodiments of the present invention may be regarded as based on, inter alia, the concepts and knowledge described in the following.

A bolted wheel joint of a wheel may be understood as a detachable mechanical connection between a rim of the wheel and a hub of the wheel and/or a brake disk or brake drum of the wheel mechanically connected to the hub. The bolted wheel joint may be produced at fixing points, using bolting devices. For example, the bolting devices may be wheel bolts, which are screwed into tapped holes of the hub, brake disk or brake drum. Alternatively, the bolting devices may be wheel nuts, which are screwed onto threaded bolts of the hub, brake disk or brake drum. The bolted wheel joint may have a number of fixing points per wheel that is a function of the vehicle.

An angular velocity or rotational speed of the hub may be measured in a highly resolved manner. For example, an angular position of an encoder on the hub may be scanned so as to allow resolution in the megahertz range. The angular position may be measured at a fixed sensor position, in the form of time differences between magnetic pulses of a magnetic encoder wheel rotating with the hub. The time differences may be sampled, for example, at a resolution of 4 MHz.

If the bolted wheel joint is loosened, the rim may tilt relative to the hub. Due to this, the rim having the tire attached to it no longer rotates about an intended axis of rotation. An oscillation of the wheel results. In other words, the rim and tire wobble. The oscillation is transmitted to the hub via the loosened bolting devices. Since the hub continues to rotate about its intended axis of rotation, a modulation of the angular velocity of the hub results. A phase angle of the modulation may be a function of the relative spatial position, in which the rim is tilted with respect to the hub. A change in the relative position yields a characteristic change in the phase angle, which may be detected.

The periodic wheel modulation of the angular velocity may be a nonuniformity of the instantaneous angular velocity during a revolution of the wheel and/or of the hub. The instantaneous angular velocity may run ahead of an idealized, uniform angular motion in at least one subrange of the revolution and lag behind it in at least one other subrange.

The rim may remain more often in certain positions relative to the hub and assume intermediate positions considerably less often and/or more rarely. If all of the bolting devices of the bolted wheel joint are equally loose, one of the relative positions across an axis of tilt may be defined by a contact point at one of the bolting devices and a diametrically opposite contact surface between the rim and the hub. For example, a wheel having six fixing points may have six preferred axes of tilt. In the case of five fixing points, the wheel may have five axes of tilt. The axes of tilt are oriented at a fixed angle to each other.

If one or more bolting devices are missing or unscrewed further than the other bolting devices, no contact point may be formed at the bolting device unscrewed further. The rim then rests, in each instance, against the adjacent bolting devices unscrewed less far and the opposite contact surface, and executes only a slight tilting motion.

Since, generally, an absolute angular position between the hub and the vehicle is unknown, the loosened bolted wheel joint may be detected, if the phase angle changes frequently by at least an expected angular increment. The angular increment may correspond to the structurally dependent angle between the axes of tilt.

If the absolute angular position between the hub and the vehicle is known, then the loosened bolted wheel joint may be detected, if the phase angle changes frequently between at least two expected angular positions. The expected angular positions may also be a function of the structurally dependent angle between the axes of tilt.

The loosened bolted wheel joint may be detected, if the change occurs frequently in response to steering movements, braking actions, acceleration events and/or excitation from the road. During steering movements, braking actions and acceleration events, additional forces act upon the wheel, which do not act when the wheel rolls freely. The additional forces may cause the rim to change from one axis of tilt to the other axis of tilt. The rim may also switch over several adjacent axes.

The angular velocity may be evaluated, using a speed signal of a speed sensor of the wheel. The modulation may be ascertained, using pulses of an encoder disk of the speed sensor reflected in the speed signal; the encoder disk being connected to the hub. An encoder disk may include angularly equidistant marking elements, which may be detected, for example, magnetically, by the speed sensor, using, for example, a Hall-effect sensor, or optically, for example, by a photoelectric sensor. During the detection of a marking element, an electrical pulse may be triggered in the speed sensor, when the marking element is located at a particular position relative to the speed sensor. In the same manner, an approximately sinusoidal signal may be generated, which reflects the position of at least one of the marking elements relative to the speed sensor. The marking elements may be spaced uniformly along a circular path. The circular path may be oriented concentrically to the axis of rotation of the hub.

A periodic wheel graduation error of the encoder disk may be compensated for. A graduation error may occur, for example, due to manufacturing tolerances. In this context, the marking elements may be situated on the circular path at slightly different distances from each other. Alternatively, or in addition, the encoder disk may not be positioned completely as intended with respect to the axis of rotation. In this manner, modulation of the angular frequency, which is not actually present, may even be indicated in the case of absolutely uniform rotation of the encoder disk. However, the graduation error is angularly fixed with respect to the hub and may be detected and compensated for.

The loosened bolted wheel joint may be detected, if, in addition, a frequency of the modulation corresponds to an expected frequency. The expected frequency may be determined, using a rotational speed of the wheel. The oscillation of the wheel is induced by the rotation of the wheel. Since the speed of the wheel is known, consequently, an excitation frequency of the oscillation is known, as well. The oscillation is reflected through the bolted wheel joint as the modulation of the angular velocity. At least one expected frequency of the modulation may be determined by the excitation frequency, which is a function of the rotational speed.

The example method in accordance with an example embodiment of the present invention may be implemented, for example, as software or hardware or as a mixture of software and hardware, in, for example, a control unit.

The present invention also provides a device, which is configured to perform, control and/or implement, in corresponding devices, the steps of a variant of the method put forward here.

The device may be an electrical device including at least one processing unit for processing signals or data, at least one storage unit for storing signals or data, and at least one interface and/or a communications interface for reading in or outputting data, which are embedded in a communications protocol. The processing unit may be, for example, a signal processor, a so-called system ASIC or a microcontroller for processing sensor signals and outputting data signals as a function of the sensor signals. The storage unit may be, for example, a flash memory, an EPROM or a magnetic storage unit. The interface may take the form of a sensor interface for inputting the sensor signals from a sensor, and/or an actuator interface for outputting the data signals and/or control signals to an actuator. The communications interface may be configured to read in or output the data wirelessly and/or by wire. The interfaces may also be software modules that are present, for example, in a microcontroller, next to other software modules.

Additionally advantageous, is a computer program product or computer program including program code, which may be stored in a machine-readable carrier or storage medium, such as a solid state memory, a hard disk storage device or an optical storage device and is used for performing, implementing and/or controlling the steps of the method according to one of the above-described specific embodiments, in particular, when the program product or program is executed on a computer or a device.

It is emphasized that some of the possible features and advantages of the present invention are described here with reference to different specific embodiments. It is apparent to one skilled in the art that the features of the device and of the method may be combined, adapted or exchanged in a suitable manner, in order to arrive at further specific embodiments of the present invention.

BRIEF DESCRIPTION OF THE DRAWINGS

Below, specific embodiments of the present invention are described with reference to the attached figures, in which case neither the figures, nor the description are to be interpreted as limiting to the present invention.

The figures are merely schematic and are not true to scale. In the figures, identical reference numerals denote like features or features functioning in the same manner.

DETAILED DESCRIPTION OF EXAMPLE EMBODIMENTS

Figure 1:
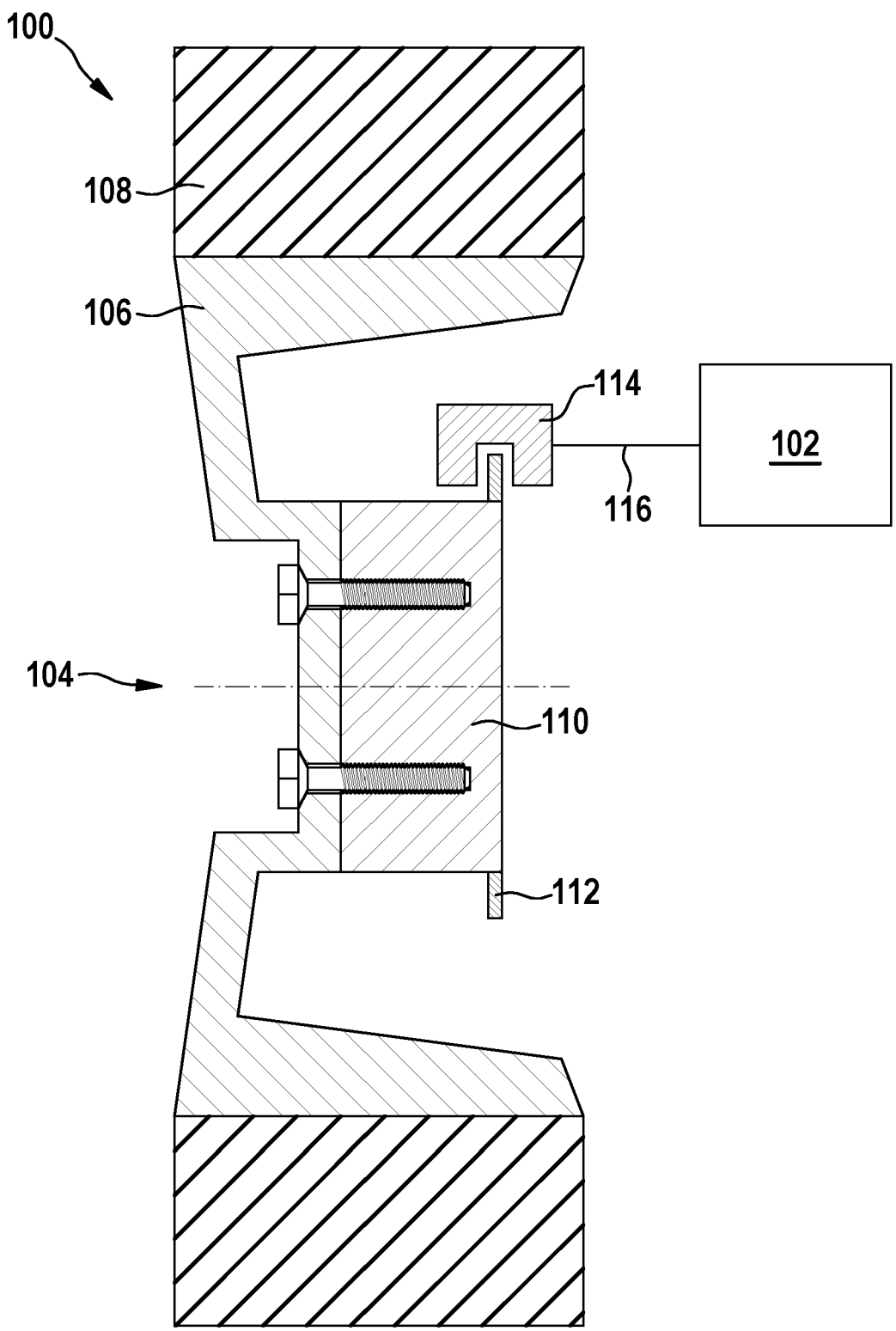
FIG. 1 shows a representation of a wheel of a vehicle having a device according to an exemplary embodiment of the present invention.

FIG. 1 shows a representation of a wheel 100 of a vehicle having a device 102 according to an exemplary embodiment of the present invention. Device 102 is configured to detect a loosened bolted wheel joint 104 of wheel 100. Wheel 100 includes a rim 106 and a tire 108 mounted on rim 106. Rim 106 is joined to a hub 110 of the vehicle by bolted wheel joint 104.

In this case, bolted wheel joint 104 includes wheel bolts, which are inserted through through-holes of rim 106 and screwed into tapped holes of hub 110. If bolted wheel joint 104 is securely tightened, as is the case here, rim 106 is pressed onto a contact surface of hub 110 and is joined, in this manner, to hub 110 in a rotatably fixed manner.

An encoder disk 112 is connected to hub 110 in a rotatably fixed manner. Encoder disk 112 is scanned contactlessly by a speed sensor 114 of the vehicle. For example, in the case of a magnetic variant of speed sensor 114, encoder disk 112 has alternating magnetic poles, which are situated in the region of a circumference of encoder disk 112, and which speed sensor 114 scans, for example, using a Hall-effect sensor.

In this context, the Hall-effect sensor measures an instantaneous magnetic flux density of a magnetic field generated by the magnetic poles and reflects this in an electrical speed signal 116. For example, the magnetic flux density is positive, when the Hall-effect sensor is situated in front of a first magnetic pole. The magnetic flux density has a zero crossing, when the Hall-effect sensor is situated between the first magnetic pole and an adjacent, second magnetic pole. The magnetic flux density is negative, when the second magnetic pole is situated in front of the Hall-effect sensor.

The magnetic poles of encoder disk 112 are positioned so as to be offset from each other by known angular increments. Due to this, an approximately sinusoidal characteristic of the magnetic flux density results. In device 102, an angular velocity of hub 106 may be derived from the period, the magnetic flux density, and the known angular increment between the magnetic poles. The period may be measured, for example, between three consecutive zero crossings of the magnetic flux density or between two consecutive maxima and/or minima of the magnetic flux density. In general, the period may be measured between two points of the characteristic of the magnetic flux density that have the same phase angle.

Device 102 evaluates electrical speed signal 116, in order to detect a loosened bolted wheel joint 104 from effects of the loosened bolted wheel joint 104 reflected in speed signal 116.

Figure 2:
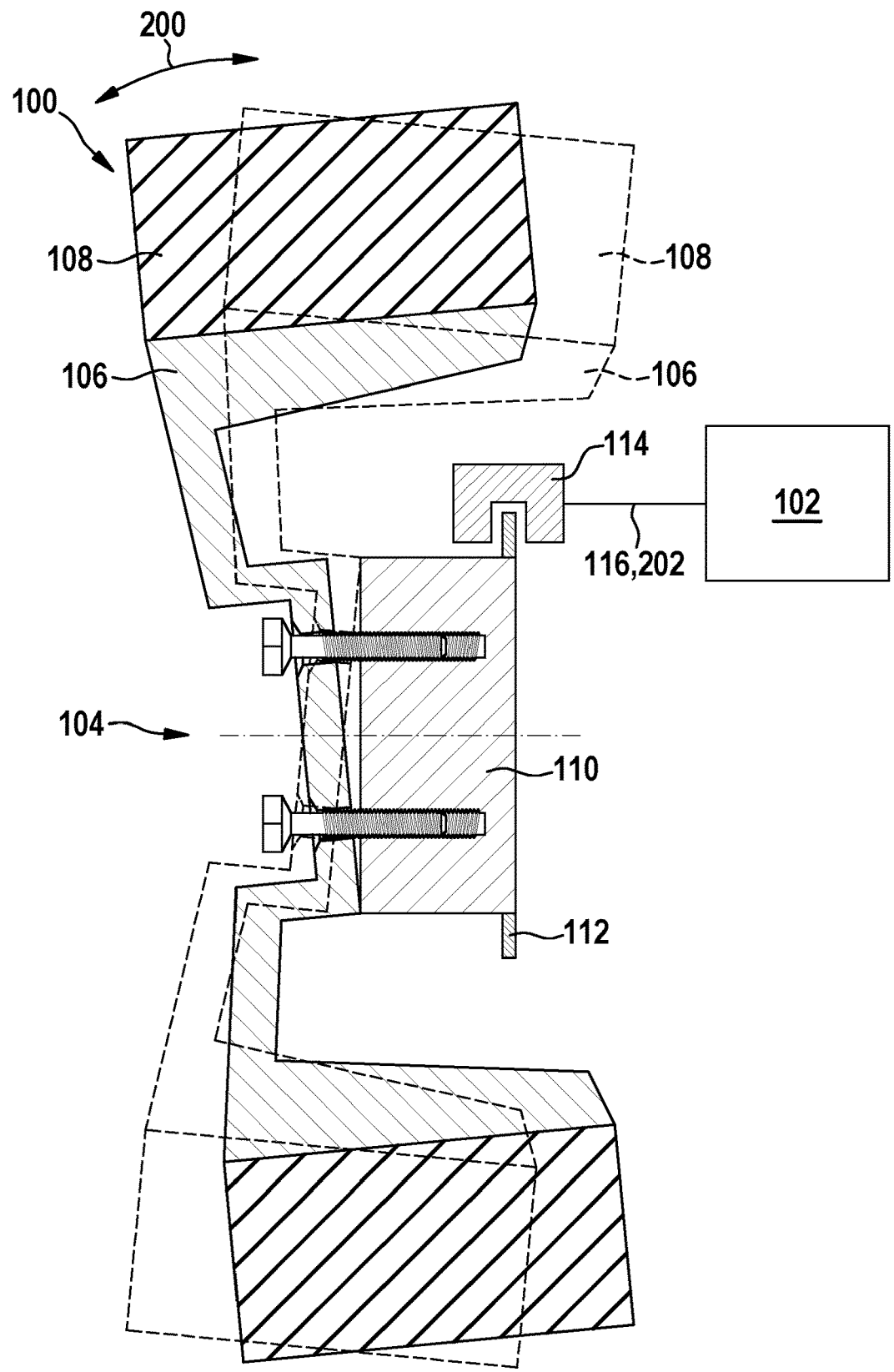
FIG. 2 shows an oscillating wheel of a vehicle having a device according to an exemplary embodiment of the present invention.

FIG. 2 shows an oscillating wheel 100 of a vehicle having a device 102 according to an exemplary embodiment. In this context, the representation in FIG. 2 corresponds substantially to the representation in FIG. 1. In contrast to that, in this case, bolted wheel joint 104 is loosened, and rim 106 is tilted with respect to hub 110. Due to the tilting, an axis of rotation of hub 110 no longer coincides with an axis of symmetry of wheel 100. When wheel 100 rotates, a serpentine track of tire 108 results, and wheel 100 oscillates and/or wobbles. Oscillation 200 is transmitted to hub 110 and results in a modulation 202 of the angular velocity.

Due to oscillation 200, wheel 100 is accelerated, that is, becomes faster, during at least a first part of a revolution, while it is decelerated, that is, becomes slower, during at least a second part of the same revolution. Consequently, modulation 202 is also reflected in speed signal 116.

In addition to oscillation 200, wheel 100 vibrates in the tilted position, since the tilted position is not stable. The vibration is transmitted to hub 110, as well, and is reflected in modulation 202.

Device 102 filters modulation 202 out of speed signal 116. Modulation 202 has an approximately sinusoidal characteristic. A frequency of modulation 202 may be proportional to a rotational frequency of wheel 100. The frequency of modulation 202 may be, in particular, an integral multiple of the rotational frequency. The vibration is superimposed on the effects of oscillation 200.

Figure 3:
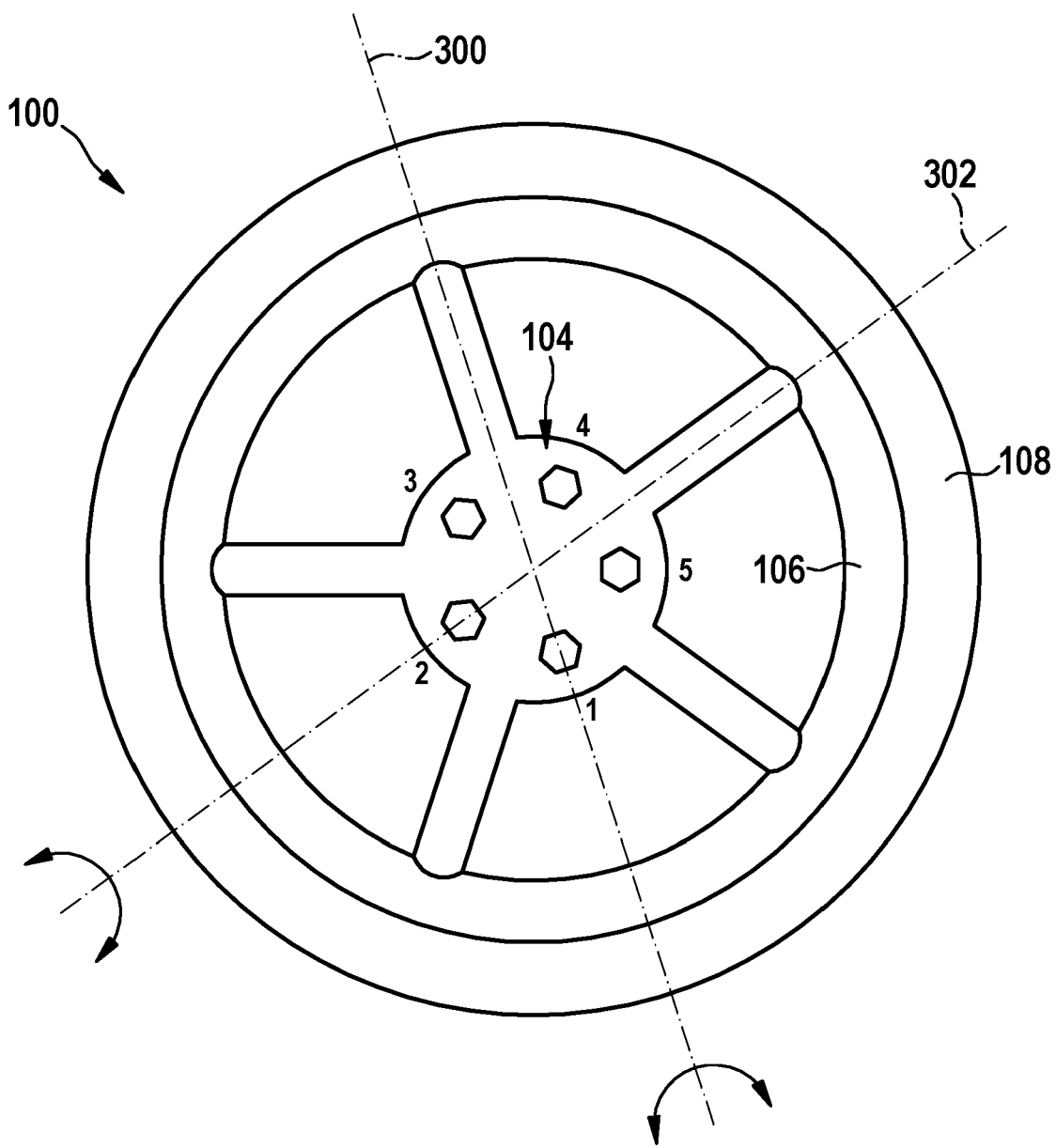
FIG. 3 shows a wheel of a vehicle, having a loosened bolted wheel joint and different axes of tilt.

FIG. 3 shows a wheel 100 of a vehicle, having a loosened bolted wheel joint 104 and different axes of tilt 300, 302. In this context, wheel 100 corresponds substantially to the wheel in FIG. 2. Angular positions of axes of tilt 300, 302 are predetermined by the type of bolted wheel joint 104. In this instance, axes of tilt 300, 302 each run through one of the fixing points of bolted wheel joint 104 and a contact surface diametrically opposite to the fixing point, between rim 106 and the hub. Thus, axes of tilt 300, 302 intersect at the center of rim 106. Axes of tilt 300, 302 have an angular increment with respect to each other that is defined by the type of bolted wheel joint 104. In the case of five fixing points, whose bolting devices are all present, the result is five axes of tilt 300, 302, which run at an angle of 72° to each other. If one of the bolting devices is missing, then this axis of tilt 300, 302 is omitted.

While wheel 100 is tilted about specific axis of tilt 300, 302, rim 106 rests against the specific bolt head or the nut of the bolting device at the fixing point, as well as against the opposite contact surface. No statically determined support is produced by only two contact points, and wheel 100 may be moved from one axis of tilt 300 to another axis of tilt 302 by external mechanical influences. This changes the position of wheel 100 relative to the hub. When the position changes from the one axis of tilt 300 to the other axis of tilt, by an angular increment defined by axes of tilt 300, 302, a phase angle of the oscillation changes. The phase angle changes by the same angular increment, by which the position changes. The change is transmitted to the hub, so that the phase angle of the modulation of the angular velocity changes by the same angle, as well.

In other words, detection of a loose wheel is signified by a phase shift in the wheel-speed signal.

Wheel-speed signals may be evaluated, in order to detect wheels of a vehicle that are becoming loose ("loose wheel detection"). For example, in the case of a wheel that has become loose, a relative motion of the wheel hub and rim observable in the wheel-speed signal during load-change situations may be evaluated.

Alternatively, or in addition, a vibration, which is detectable as an increase in amplitude in the line spectrum and is in the form of periodic wheel modulation of the wheel speed, is used. To this end, the signal of the measured time differences is normalized with respect to the velocity, and the encoder wheel tooth-spacing error, as well as the spectral component influenced by the imbalance of the wheel, are optionally compensated for. In order to detect the periodic wheel modulation, the signal is transformed into the angular frequency domain. In view of the estimated road noise, if the line spectrum lies above threshold amplitude values, a loosened wheel is detected, as well.

Using the approach put forward here, unequivocal and robust classification of the characteristics observed in the wheel-speed signal for the state "loose wheel" is achieved. In this context, the loose-wheel detection is carried out on the basis of a phase shift in the wheel-speed signal of the wheel that has become loose.

A loose wheel, in which all of the wheel bolts/nuts are loosened, but the wheel is still held by at least one, is detected by evaluating the phase angle of oscillations in the wheel-speed signal and their significant change in particular driving situations. In comparison with current methods, the approach put forward here provides a considerably increased ability to distinguish between a loose wheel and other effects superimposed in the wheel-speed signal. This leads to more robust and higher-performing detection.

The signal of time differences between magnetic pulses, which is measured angularly equidistantly per wheel, per wheel-speed sensor, is initially processed in a manner analogous to the known detection of the vibration effect. The measured time differences $\Delta t_i$ are preferably adjusted to a mean time difference $\Delta t$Mean. Mean time difference $\Delta t$Mean is preferably averaged over a revolution of the wheel. The encoder wheel tooth-spacing error is compensated for in the signal, which is now independent of the velocity. Subsequently, the spectral amplitudes and phases of this signal are calculated, for example, using Fourier transformation and/or filtering. In particular, the spectral lines 2, 3, 4, 5, 10 are of interest for loose-wheel detection in the case of, for example, five wheel bolts/nuts.

In an alternative exemplary embodiment of the present invention, the adjustment to the mean time difference is omitted. In this case, the line spectrum is superimposed with a continuous spectrum, which represents the velocity and acceleration behavior. For example, during a trip at an approximately constant velocity, the interesting spectral amplitudes only differ negligibly from those of the preceding exemplary embodiment.

In a further exemplary embodiment of the present invention, the compensation for the encoder wheel tooth-spacing error is omitted. Then, it is implicitly assumed that the phase shift due to the state "loose wheel" is significant in comparison with the phase of the tooth-spacing error. This exemplary embodiment may be implemented both with and without determination of a reference position.

The quality of the loose-wheel detection may be improved considerably by monitoring the phase of the wheel-speed signal and detecting a phase shift, which is significant for the state "loose wheel."

A sectional view of a hub in the state "secure wheel" is shown in FIG. 1. The same hub in the state "loose wheel" is shown in FIG. 2. In the state "loose wheel," the rim oscillates from one bolt to another, and consequently, in the case of, e.g., five wheel bolts, a phase shift of $2\pi/5=1.2566$ rad and integral multiples of it occurs particularly frequently.

The physical reason for the accumulation of the phase shift around 1.2566 rad is shown clearly in FIG. 3. The depicted wheel having loosened wheel bolts oscillates initially about the first axis having a first phase 300. In this instance, the rim rests permanently against the first bolt and alternates periodically between bolt pairs two and three and four and five. Due to a dynamic effect, such as a change in the wheel torques, transverse forces, steering movements, or roughness of the road, the axis of oscillation changes from first phase 300 to a second phase 302. The loose wheel now rests constantly against the second bolt and oscillates between the bolt pairs three and four and five and one.

The example described in FIG. 3 shows the behavior in the case of five wheel bolts, which are all still anchored in the wheel hub. The behavior is also detectable with wheel nuts, and if one or more bolts are already missing. The effect is also observable in the case of a different number of bolts. In this case, only the angle of the accumulation of the phase shift changes. For example, in the case of six wheel bolts, the angle is $2\pi/6=1.0472$ rad.

In other words, FIG. 3 shows the phase shift of the loose wheel. First axis 300 illustrates the phase angle prior to the change. Second axis 302 shows a step change of 1.2566 rad.

Finally, it should be pointed out that terms, such as "having," "including," etc., do not exclude any other elements or steps, and that terms, such as "a" or "an," do not exclude a plurality. Reference numerals are not to be regarded as a limitation.

What is claimed is:

1. A method for detecting a loosened bolted wheel joint on a wheel of a vehicle, the method comprising the following steps:
   evaluating an angular velocity of a hub of the wheel;
   ascertaining a periodic wheel modulation of the angular velocity; and
   detecting an oscillation of the wheel generated due to the loosened bolted wheel joint, using a change in a phase angle of the modulation, wherein the loosened bolted wheel joint is detected when the phase angle changes frequently by at least an expected angular increment.

2. The method as recited in claim 1, wherein the loosened bolted wheel joint is detected when the phase angle changes frequently between at least two expected angular positions.

3. The method as recited in claim 1, wherein the loosened bolted wheel joint is detected when the change occurs frequently in response to steering movements, and/or braking actions, and/or acceleration events and/or excitation from a road.

4. The method as recited in claim 1, wherein the angular velocity is evaluated using a speed signal of a speed sensor of the wheel, and the modulation is ascertained using pulses of an encoder disk of the speed sensor, the encoder disc being connected to the hub, and the pulses being reflected in the speed signal.

5. The method as recited in claim 4, wherein a periodic wheel graduation error of the encoder disk is compensated for.

6. The method as recited in claim 1, wherein the loosened bolted wheel joint is detected when a frequency of the modulation corresponds to an expected frequency, the expected frequency being determined, using a rotational speed of the wheel.

7. The method as recited in claim 1, wherein the expected angular increment corresponds to an angle between axes of tilt of the wheel.

8. A device configured to detect a loosened bolted wheel joint on a wheel of a vehicle, the device configured to:
   evaluate an angular velocity of a hub of the wheel;
   ascertain a periodic wheel modulation of the angular velocity; and
   detect an oscillation of the wheel generated due to the loosened bolted wheel joint, using a change in a phase angle of the modulation, wherein the loosened bolted wheel joint is detected when the phase angle changes frequently by at least an expected angular increment.

9. The device as recited in claim 8, wherein the expected angular increment corresponds to an angle between axes of tilt of the wheel.

10. A non-transitory machine-readable storage medium on which is stored a computer program for detecting a loosened bolted wheel joint on a wheel of a vehicle, the computer program, when executed by a computer, causing the computer to perform the following steps:
    evaluating an angular velocity of a hub of the wheel;
    ascertaining a periodic wheel modulation of the angular velocity; and
    detecting an oscillation of the wheel generated due to the loosened bolted wheel joint, using a change in a phase angle of the modulation, wherein the loosened bolted wheel joint is detected when the phase angle changes frequently by at least an expected angular increment.

11. The non-transitory machine-readable storage medium as recited in claim 10, wherein the expected angular increment corresponds to an angle between axes of tilt of the wheel.

* * * * *